Sept. 6, 1966  A. E. BERGSTRÖM ETAL  3,271,504
APPARATUS AND METHOD FOR VULCANIZING STRIPS OF MATERIAL
CONTAINING AN ELASTOMER
Filed Nov. 5, 1962                              3 Sheets-Sheet 2

3,271,504
APPARATUS AND METHOD FOR VULCANIZING STRIPS OF MATERIAL CONTAINING AN ELASTOMER
Axel Emil Bergström, Lidingo, Rudolf Gotthard Hallhagen, Goteborg, and Leif Erik Roland Söderberg and Johan Eric Hayden Westberg, Lidingo, Sweden, assignors to AGA Aktiebolag, a corporation of Sweden
Filed Nov. 5, 1962, Ser. No. 235,565
Claims priority, application Sweden, Nov. 23, 1961, 11,658/61
5 Claims. (Cl. 264—347)

This invention relates to an apparatus and method for vulcanizing strips of material containing an elastomer.

In the production of strips of material comprising an elastomer which has been soaked or otherwise impregnated into a backing web, there are essentially two methods of vulcanizing the elastomer. In one method the strip of material is wound in an unvulcanized state together with an electrical resistance band on to a mandrel, after which a current is supplied to the resistance band for producing the heat required for vulcanization. In the second method, the strip is wound in an unvulcanized state together with an intermediate band on to a mandrel after which heated air or other heated gas is supplied to create the heat required for vulcanization. The present invention is concerned with the second above-mentioned method with the use of an intermediate band which is used merely to separate the various layers of the material.

Many of the difficulties encountered in the second abovementioned method are in choosing a suitable material for the intermediate band which is indispensible for preventing the turns of the elastomer roll from being vulcanized together. It is clear that the intermediate band must be of a material which does not attach itself by vulcanization to the elastomer, and practical experience has shown that a number of additional requirements must be met regarding the choice of material for the intermediate band.

Vulcanization must take place at a relatively high temperature, and consequently the material of the intermediate band must be able to withstand this high temperature. The product obtained after vulcanization must be smooth and consequently the intermediate band must have smooth outer surfaces. As a rule, a woven material cannot therefore be used as the intermediate band.

During vulcanization the elastomer material is subjected to pressure at the same time as the roll of material is rotated. It is not possible under these conditions to avoid tensioning of the roll which causes a gradual diminishing of its diameter. As vulcanization takes place, it is known that diminishing of the thickness of the material will occur and this causes the intermediate band to be gradually displaced relative to the elastomer material. If the terminal part of the elastomer material, i.e. the end of the material lying in the outermost layer of the roll, finishes approximately 10 mm. short of the end of the intermediate band, then after the vulcanization process has taken place it may be expected that the intermediate band will protrude at least 200 mm. beyond the end of the elastomer material. The intermediate band therefore must be of an elastically compressible and extensible material so as not to crease during the rotation of the roll and thereby avoid surface patterns on the material after vulcanization.

A further requirement is that the friction between the intermediate band and the elastomer material must be as small as possible so as to permit gradual sliding between the two.

Furthermore, the material of the intermediate band must have sufficient mechanical strength not to be torn by movements forced upon it by the vulcanization process.

Finally, in one particular method of vulcanizing the material the roll of material is heated exclusively by means of a heat transfer medium which supplies heat to the inside, the outside and the ends of the roll simultaneously. If these surfaces of the roll are heated to a temperature at which vulcanization takes place it is also important that the interior of the roll also be heated to a vulcanization temperature and therefore it is equally important that the intermediate band be as thin as possible and also have good heat conductive properties.

It is apparent from the above that there are a number of requirements for the material of the intermediate band and accordingly it has proved extremely difficult in practice to find a suitable material for this purpose.

In order to explain more particularly the reasons why the above properties are required for the intermediate band it is suitable to describe briefly the apparatus which performs the vulcanization. For this purpose reference is made to the accompanying drawings, in which.

Figure 1:
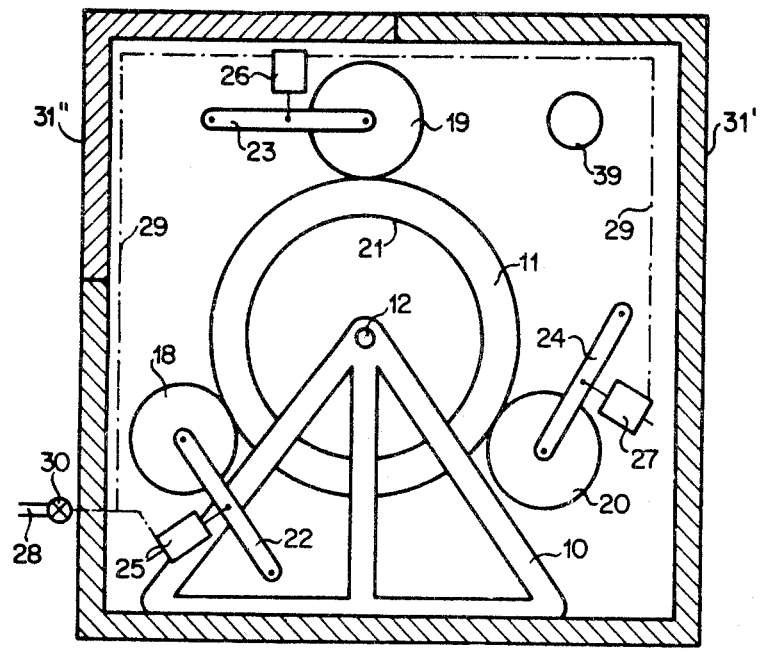
FIG. 1 is a schematic end elevation of apparatus for performing the vulcanization.

Referring now to the drawing, in FIG. 1 the apparatus includes a supporting frame 10 for a roll of material 11 wound on a mandrel 21 having an axle 12. The roll 11 is rotated at constant speed by a pulley 13 mounted on the axle 12, the pulley 13 being driven by rope 14 from a further pulley 15 through worm gear 16 from motor 17. Three pressure rollers 18, 19 and 20 are provided and mounted in any suitable manner. It is not important for the number of pressure rollers to be three so long as there are two or more and they are distributed symmetrically around the periphery of roll 11.

The roll 11 is formed from strip material containing an elastomer and is, for example, one hundred metres in length. Between each adjacent turn of the material is an intermediate band which consists of a material of good heat conductivity, but which will not attach itself by vulcanization to the elastomer. The pressure rollers 18, 19 and 20 are urged resiliently against the roll 11, the arrangement being such as to allow regulation of the pressure. In the embodiment shown in the drawing, each pressure roller is journalled in a pair of pivoted levers 22, 23 or 24, which are urged radially against roll 11 by pneumatic piston and cylinder assemblies 25, 26 and 27 respectively. These assemblies are connected to a common source of compressed air or other pressure medium via conduits 28 and 29 which contain a common valve 30 for controlling fluid pressure to the conduit 29.

The entire apparatus is enclosed in a casing 31' of a material having good heat insulating properties and having a removable lid 31" allowing insertion of the material and the intermediate band. Preferably outside the casing is a heat generator 32 in which air is heated, for example by electrical heating elements, to which current is supplied via conductors 33 and 34, a control resistor 35 and a switch 36. The heated air is forced by a fan through the conduit 37 into the interior of mandrel 21 which supports the roll 11. The interior of mandrel 21 is in the form of a heat exchanger which transfers heat from the heated air to the mandrel and thus to roll 11.

The heat exchanger may comprise flanges which create turbulence of the heated air so as to cause it to transfer a substantial proportion of its heat content to the mandrel 21.

The heated air, after its passage through mandrel 21, flows into the interior of the casing 31', 31" from which it is returned to the heat generator 32, through conduit 39 to be reheated. The air within casing 31', 31" heats the roll 11 from the outside. With this arrangement it is possible to heat the roll 11 to a working temperature in a comparatively short period of time by supplying heat to it from both the inside and outside thereof.

Figure 3:
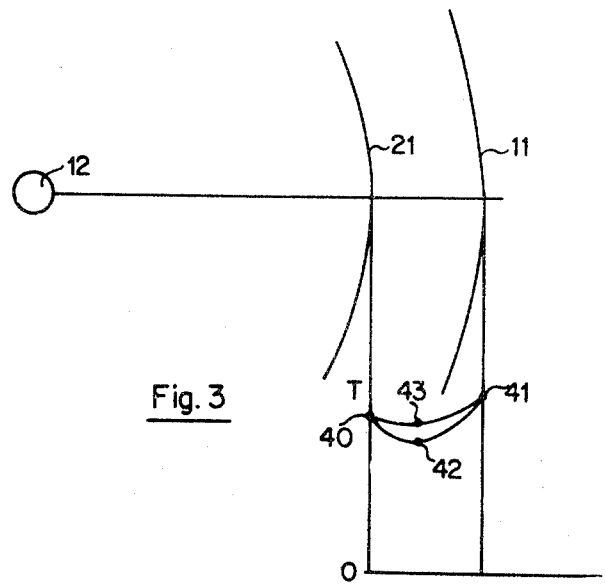
FIG. 3 is a diagram showing the temperature distribution through a roll of material to be vulcanized.
Figure 2:
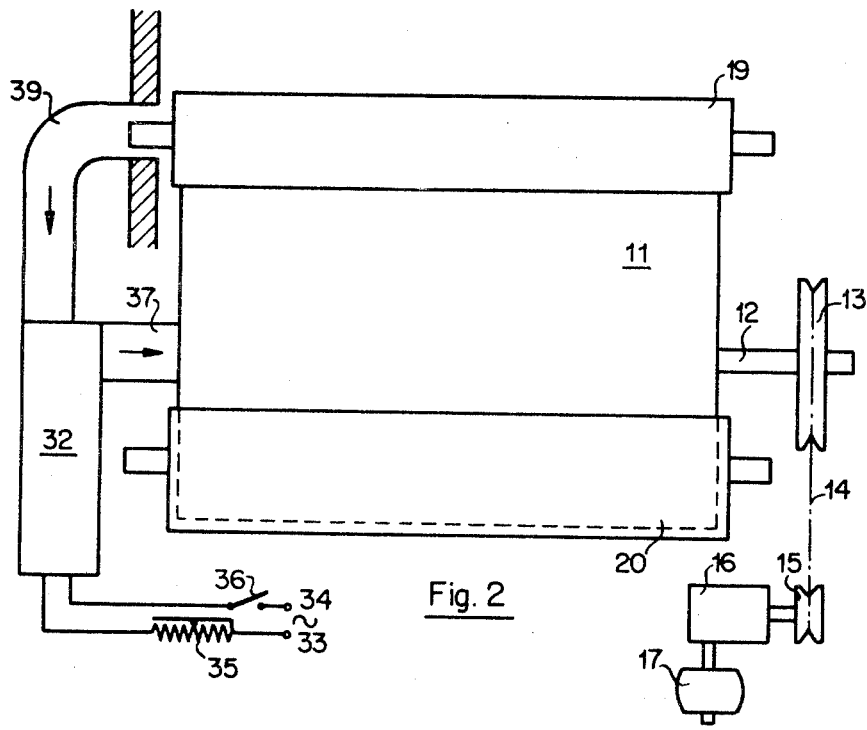
FIG. 2 is a schematic side elevation of the apparatus illustrated in FIG. 1.

FIG. 3 shows a schematical section on an enlarged scale taken through the roll 11 and mandrel 21. At the lower end of this figure is a temperature gradient diagram showing the distribution of the temperature in the interior of roll 11. When the temperature has reached a value at which vulcanization can take place it will have a relatively large value at point 40, i.e., where the material being treated is in direct contact with mandrel 21 and also a point 41, i.e., where the material is contacted directly by the surrounding heated air within the casing. On the other hand a lower temperature will exist at some intermediate point between points 40 and 41, for example point 42. Owing to the gradual equalization of the temperature in the roll this minimum temperature will rise during the vulcanizing period to a value 43 at the termination of the period. Under normal conditions, the difference in temperature between the points 40 and 41 on the one hand and the points 42 and 43 on the other, would be large enough to cause the resulting vulcanization to be too uneven to give a desirable result. If the temperatures at the points 40 and 41 are selected so as just to cause complete vulcanization of the elastomer, it will be insufficiently vulcanized in the centre where the temperature has a lower value. If, on the other hand, higher temperatures are utilized so that the temperature at the points 42 and 43 are sufficient for complete vulcanization of the elastomer in the centre of the material, then the elastomer at points 40 and 41 will be over-vulcanized. Furthermore, it is not possible under normal conditions to obtain an even vulcanization by causing a slight over-vulcanization at the points 40 and 41 and at the same time a slight under-vulcanization at the points 42 and 43 because the temperature difference will be too large.

Figure 4:
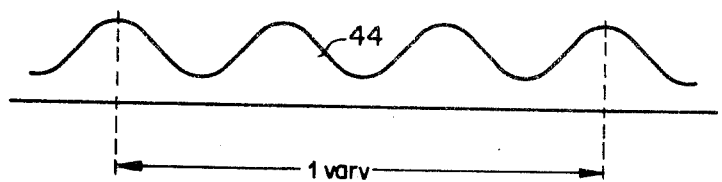
FIG. 4 is a diagram of the pressure distribution normal to the periphery of a roll of material.

FIG. 4 shows a diagram of the variations in pressure 44 from the pressure rollers 18, 19 and 20 during one revolution of the roll 11. Because of this variation in pressure, a certain equalization in temperature in the interior of roll 11 will occur but this is not sufficient for the vulcanized product to be of a satisfactory quality unless steps are taken to provide an extremely low heat conduction resistance through the intermediate band.

Figure 5:
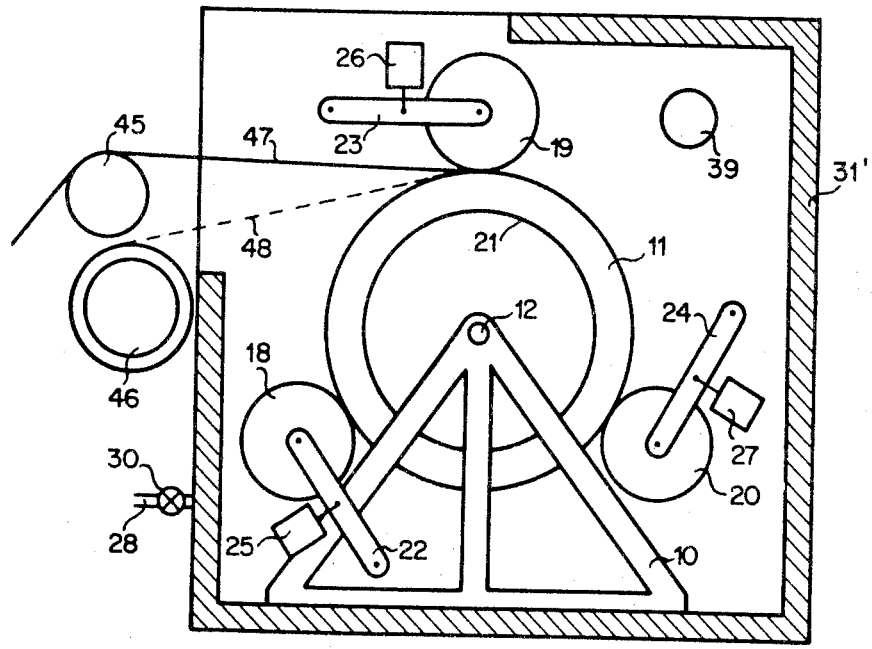
FIG. 5 is a schematic end elevation of the apparatus illustrated in FIG. 1 with the lid of the casing removed showing the way in which the elastomer material and the intermediate band are fed to form a roll.

FIG. 5 shows similar apparatus to that of FIG. 1 with the lid 31" of the casing 31' removed. The feeding of an elastomer material with an intermediate band is illustrated. It is not important to the present invention in what manner the strip material in a non-vulcanized state has been produced although one suitable method may consist in passing a web of suitable material such as a synthetic plastics material to which an elastomer attaches itself during the vulcanizing process, through a bath of the elastomer material in a viscous state so that the web absorbs substantial quantities of the elastomer. After this, the web with the elastomer is passed through a pair of rollers with a predetermined spacing which determines the thickness of the strip produced. The strip of material 47 so produced is then fed into the apparatus over roller 45 and is wound into the form of roll 11 around mandrel 21. Together with the strip 47, an intermediate band 48 is wound from a store roller 46.

The present invention refers to the choice of a material which forms the intermediate band 48 which is interposed between the turns of the roll 11. The easiest way of explaining the choice of material will be to give some indictation of the experimentation which led up to the choice of the particular material.

It is well known that most metals do not tend to attach themselves to elastomers by vulcanization and this property is characteristic of aluminium. It appeared an obvious solution therefore to use aluminium foil as the intermediate band particularly because of its strength, low frictional resistance and good heat conduction. However, experiments showed that aluminium was not suitable for a reason which could not readily be foreseen.

The length of the elastomer material 47 which was used was 100 mm. If the uncured material and the aluminium foil used as an intermediate band 48 are fed with an angular deviation between the longitudinal paths of movement as small as possible, then even this angular error leads to a displacement laterally of one strip relative to the other which, over a length of 100 mm., is very considerable. This is due to the stiffness in the aluminium foil which renders it impossible to force it laterally without making one side having a larger diameter than the other and this creates an air space on the side where the aluminium foil has the larger diameter. On this side heat will not be transferred in a sufficient degree to the intermediate layers of the material and this will cause incompleteness of vulcanization.

It was then suggested to employ metallized paper, preferably paper which had been metallized with aluminium. However, this also proved unsatisfactory. The reason for this was that the paper was subjected during vulcanization to a partial drying with the consequence that the paper became brittle. Also, the calendered coating of aluminium tended to disengage itself from the paper backing and to adhere to the elastomer material thus forming vacuum spaces. It was therefore impossible to use the same intermediate band more than once and even if the band were used for a single vulcanization process there was no guarantee that scattered spots of aluminium would not adhere by vacuum to the elastomer material. The removal of these spots was difficult and wastage of material was encountered.

During the course of these experiments various types of synthetic plastics materials were substituted for the aluminium foil. It is well known that the most common insulating material in the rubber industry is viscous film which is not plastic but it was found that this material did not have sufficient mechanical strength to be used as the intermediate band.

Tri-acetate foil was also used but this proved to have the peculiar property of absorbing air at a certain temperature during both the heating and cooling periods of the vulcanizaiton process. This effect was sufficiently strong to produce a pronounced vacuum between the intermediate band and the adjacent elastomer material. During the winding-off process, when the tri-acetate film was to be separated from the vulcanized material, pieces of the film were torn off the foil and attached themselves by vacuum suction to the material and an effect similar in nature to that encountered with metallized paper was present.

An attempt was also made to use foil of simple polyamides such as purlon. However, these materials proved to have insufficient heat stability and were therefore inapplicable.

Complex polyamides such as nylon do have the heat stability but it has not been possible as yet to calender such polyamides to form a foil and all that can be done is to spin them into fibres and yarn and weave a web. However, this produces imprints in the elastomer material which are undesirable. In this connection an attempt was made to use rubber impregnated complex polyamide but this also did not lead to the desired result. It is known that completely vulcanized rubber does not attach itself by vulcanization to fresh elastomers such as natural rubber and it was therefore reasonable to assume that such an intermediate band would be usable. However, if the band were made sufficiently thin for the heat insulation to be small enough, it was found that the formation of imprints from the nylon webbing was not obviated. If it was made thick enough to suppress these imprints, then the heat conduction resistance was too large.

Attempts were also made with a thin foil of pure completely vulcanized rubber but this proved to have such a large co-efficient of friction relative to the elastomer material that the required sliding could not take place and gave rise to creasing and the formation of rough spots on the finished product.

This led to an attempt to use polycarbonate foil as the material of the intermediate band since polycarbonate was thought to have all the desirable properties indicated above. The experiments did show that it was possible to produce one or even more vulcanized elastomer strips of 100 mm. in length with one and the same polycarbonate foil but that ruptures of the foil occurred. When ruptures occurred in the foil this happened not only at one point during the same vulcanization process but at a plurality of irregularly distributed points and an inner layer of the elastomer material was vulcanized to its adjacent outer layer.

It was not until all the preparatory experiments had been performed that it was considered necessary to try foil of a material which would not be expected to be usable for the purpose since it has very high heat insulation. This material was chlorosulfonated polyethylene foil, such as "Hypalon," or polyester foil. However, it turned out to be possible to make this foil thin enough to compensate for the heat insulation property and the foil was found to meet the above requirements. In addition, it had sufficient strength to be used a considerable number of times.

Attempts to find the minimum thickness for the above-mentioned foil indicated that the strength is sufficient and the heat insulation very small down to a thickness of 0.127 mm. Experiments in which such a foil was used as the intermediate band in the above-described vulcanization process have given excellent results.

What we claim is:

1. A method of vulcanizing an elongate weft impregnated with a vulcanizable elastomer, comprising winding said weft into a roll form and simultaneously interposing an intermediate layer member between adjacent turns of said weft to maintain said adjacent turns separate from each other, rotating said roll and applying external pressure to the periphery thereof, and passing a heated fluid in heat transfer relationship with said roll form, said intermediate layer member being formed of chlorosulfonated polyethylenes.

2. A method according to claim 1 wherein said intermediate layer has a thickness of approximately 0.127 mm.

3. A method according to claim 2 wherein said intermediate layer member is a foil of chlorosulfonated polyethylene.

4. In an apparatus for vulcanizing strips of weft material containing a vulcanizable elastomer, comprising a cylindrical mandrel for holding an elongate strip of weft material in tightly wound roll form around said mandrel, means for rotating the mandrel, means for applying pressure intermittently to the periphery of the mandrel, and means for passing a heated fluid over the surface of the roll of material, the improvement comprising a continuous intermediate layer member between adjacent turns of said weft material for maintaining said adjacent turns separate from each other, said intermediate layer member being formed of chlorosulfonated polyethylenes.

5. Apparatus as set forth in claim 4 wherein the thickness of said intermediate layer member is substantially 0.127 mm.

References Cited by the Examiner

UNITED STATES PATENTS

| | | | |
|---|---|---|---|
| 1,237,554 | 8/1917 | Price | 264—347 |
| 2,703,436 | 3/1955 | Rhee et al. | 264—85 |
| 2,854,698 | 10/1958 | Youngs | 264—347 |

ALEXANDER H. BRODMERKEL, *Primary Examiner.*

M. ROSEN, F. S. WHISENHUNT, *Assistant Examiners.*